United States Patent
Moon et al.

(10) Patent No.: US 10,394,360 B2
(45) Date of Patent: Aug. 27, 2019

(54) TOUCH SENSOR, DISPLAY DEVICE INCLUDING THE SAME, AND METHOD OF FABRICATING DISPLAY DEVICE

(71) Applicant: Samsung Display Co., Ltd., Yongin-si (KR)

(72) Inventors: Sung Jae Moon, Yongin-si (KR); Jong Hwa Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 39 days.

(21) Appl. No.: 15/803,212

(22) Filed: Nov. 3, 2017

(65) Prior Publication Data
US 2018/0267656 A1    Sep. 20, 2018

(30) Foreign Application Priority Data
Mar. 15, 2017   (KR) .................. 10-2017-0032418

(51) Int. Cl.
*G06F 3/044*   (2006.01)
*G06F 3/041*   (2006.01)

(52) U.S. Cl.
CPC ............ *G06F 3/0412* (2013.01); *G06F 3/044* (2013.01); *G06F 2203/04103* (2013.01); *G06F 2203/04111* (2013.01); *G06F 2203/04112* (2013.01)

(58) Field of Classification Search
CPC ............ G06F 2203/04103; G06F 2203/04111; G06F 2203/04112; G06F 3/0412; G06F 3/044
USPC .................................................. 345/170–176
See application file for complete search history.

(56) References Cited

U.S. PATENT DOCUMENTS

| | | | | |
|---|---|---|---|---|
| 8,085,250 B2* | 12/2011 | Reynolds | ............ | G06F 3/03547 345/173 |
| 9,239,654 B2 | 1/2016 | Jang | | |
| 10,185,434 B2* | 1/2019 | Suzuki | .................. | G06F 3/0416 |
| 2005/0172722 A1* | 8/2005 | Kobayashi | ................ | G01L 1/14 73/754 |
| 2010/0110041 A1* | 5/2010 | Jang | ...................... | G06F 3/0412 345/174 |
| 2010/0182253 A1* | 7/2010 | Park | ........................ | G06F 3/044 345/173 |
| 2013/0271675 A1* | 10/2013 | Misaki | .................... | G06F 3/044 349/12 |
| 2015/0277483 A1* | 10/2015 | Lee | ........................ | G06F 3/044 345/174 |
| 2016/0117042 A1* | 4/2016 | Ito | .......................... | G06F 3/044 345/173 |
| 2016/0195979 A1* | 7/2016 | Lee | ........................ | G06F 3/044 345/173 |
| 2016/0195986 A1 | 7/2016 | Kwon et al. | | |

(Continued)

FOREIGN PATENT DOCUMENTS

KR    10-1373044    3/2014

*Primary Examiner* — Tony O Davis
(74) *Attorney, Agent, or Firm* — H.C. Park & Associates, PLC

(57) ABSTRACT

A touch sensor includes sensing electrodes and a sensing line. The sensing line is coupled to the sensing electrodes. Each of the sensing electrodes includes a first region and a second region. The first region has a flat surface. The second region is disposed around a perimeter of the first region. The surface of the second region forms an inclination angle relative to the flat surface of the first region.

32 Claims, 17 Drawing Sheets

(56) References Cited

U.S. PATENT DOCUMENTS

2016/0253001 A1* 9/2016 Sugita .................... G06F 3/044
 345/174
2018/0203280 A1* 7/2018 Yamashita ............ G02F 1/1368
2018/0329537 A1* 11/2018 Gunji .................... G06F 3/0418

* cited by examiner

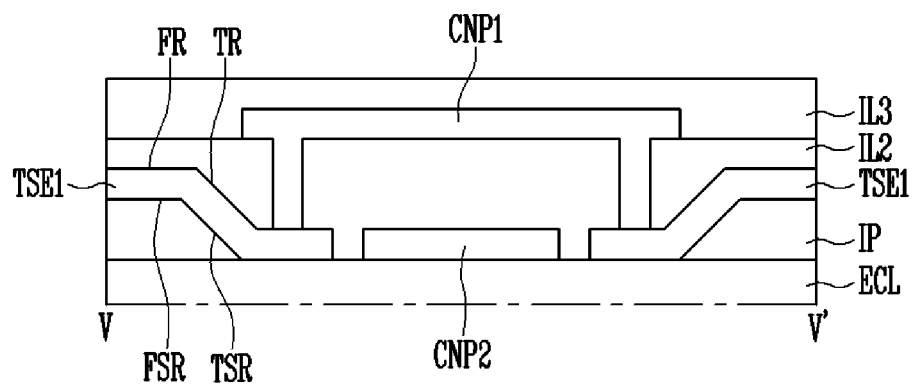
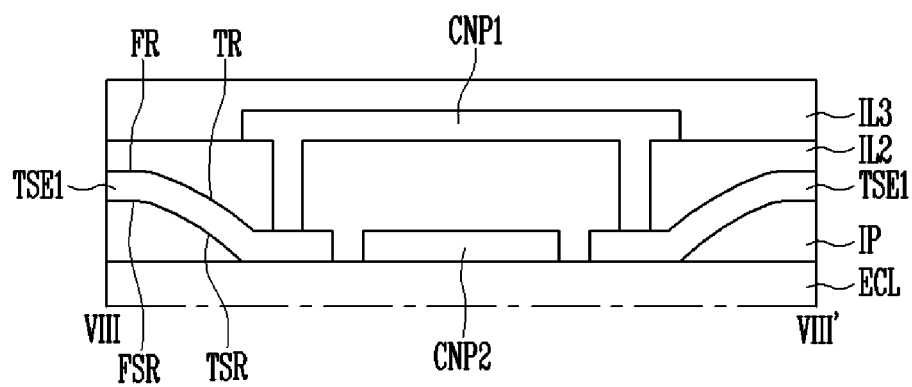

TOUCH SENSOR, DISPLAY DEVICE INCLUDING THE SAME, AND METHOD OF FABRICATING DISPLAY DEVICE

CROSS-REFERENCE TO RELATED APPLICATION

This application claims priority from and the benefit of Korean Patent Application No. 10-2017-0032418, filed Mar. 15, 2017, which is hereby incorporated by reference for all purposes as if fully set forth herein.

BACKGROUND

Field

The disclosure generally relates to a touch sensor, a display device including the same, and a method of fabricating the display device.

Discussion

Display devices may include an information input function, as well as an image display function. The information input function of a display device may be generally embodied in the form of a touch sensor, which is configured to sense a touch interaction (e.g., a touch input, a hovering input, an approach input, etc.) of a user. The touch sensor may be attached to one surface of the display panel that embodies the image display function, or may be integrally formed with the display panel. As such, the user may watch an image displayed on the display panel, as well as interact with the touch sensor to input information.

The above information disclosed in this section is only for enhancement of an understanding of the background of the inventive concepts, and, therefore, it may contain information that does not form prior art already known to a person of ordinary skill in the art.

SUMMARY

Some exemplary embodiments are capable of providing a touch sensor having an enhanced touch sensing sensitivity.

Some exemplary embodiments are capable of providing a display device including a touch sensor having an enhanced touch sensing sensitivity.

Some exemplary embodiments are capable of providing a method of fabricating a display device including a touch sensor having an enhanced touch sensing sensitivity.

Additional aspects will be set forth in the detailed description which follows, and, in part, will be apparent from the disclosure, or may be learned by practice of the inventive concepts.

According to some exemplary embodiments, a touch sensor includes sensing electrodes and a sensing line. The sensing line is coupled to the sensing electrodes. Each of the sensing electrodes includes a first region and a second region. The first region has a flat surface. The second region is disposed around a perimeter of the first region. The surface of the second region forms an inclination angle relative to the flat surface of the first region.

According to some exemplary embodiments, a display device includes a display panel and a touch sensor. The touch sensor is disposed on the display panel. The touch sensor includes sensing electrodes and a sensing line. The sensing line is coupled to the sensing electrodes. Each of the sensing electrodes includes a first region and a second region. The first region has a flat surface. The second region is disposed around a perimeter of the first region. The surface of the second region forms an inclination angle relative to the flat surface of the first region.

According to some exemplary embodiments, a method of fabricating a display device includes forming a touch sensor on the display panel. Forming the touch sensor includes: forming an insulating layer on the display panel; and forming a conductive layer on the insulating layer. The conductive layer includes sensing electrodes, each of the sensing electrodes including a first region and a second region. The first region has a flat surface. The second region is disposed around a perimeter of the first region. A surface of the second region forms an inclination angle relative to the flat surface of the first region.

According to some exemplary embodiments, a touch sensor includes insulating patterns and sensing electrodes. The insulating patterns include: a first insulating pattern; and a second insulating pattern disposed on the first insulating pattern. The sensing electrodes cover the insulating patterns. An area of the first insulating pattern differs from an area of the second insulating pattern.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIGS. 16A, 16B, 17A, 17B, 18A, 18B, 19A, and 19B are views illustrating a display device according to some exemplary embodiments.

DETAILED DESCRIPTION OF THE ILLUSTRATED EMBODIMENTS

Figure 1:
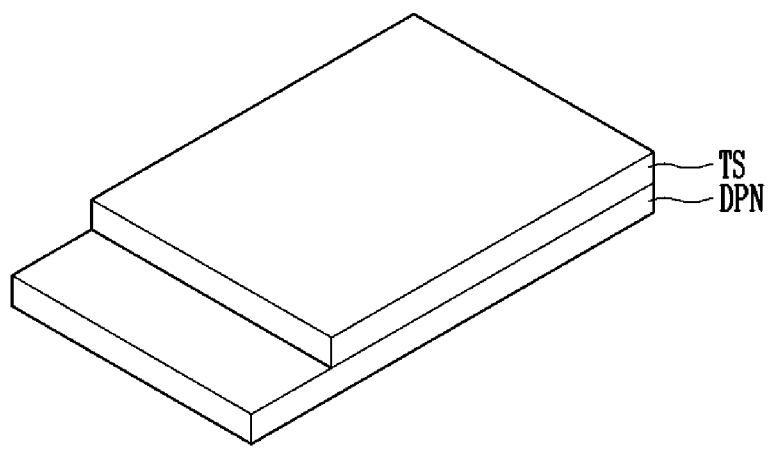
FIG. 1 is a perspective view illustrating a display device including a touch sensor according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the spirit and the scope of the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
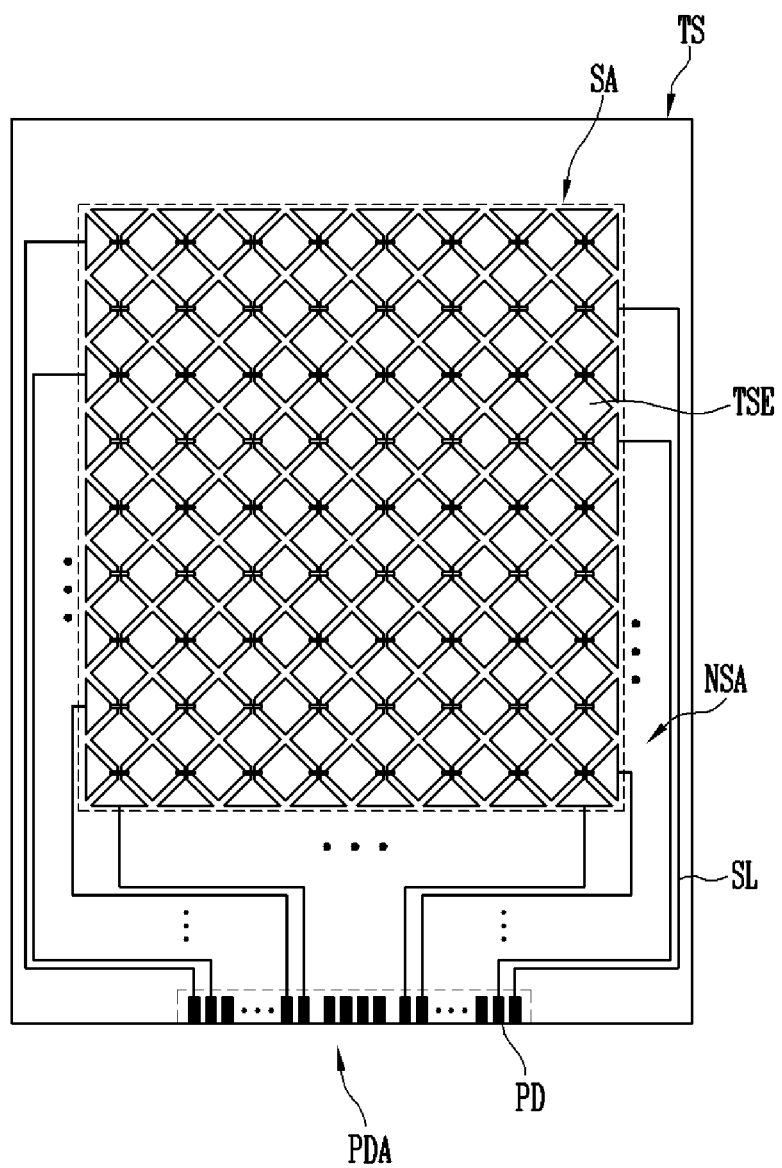
FIG. 2 is a plan view schematically illustrating the touch sensor of FIG. 1 according to some exemplary embodiments.
Figure 3:
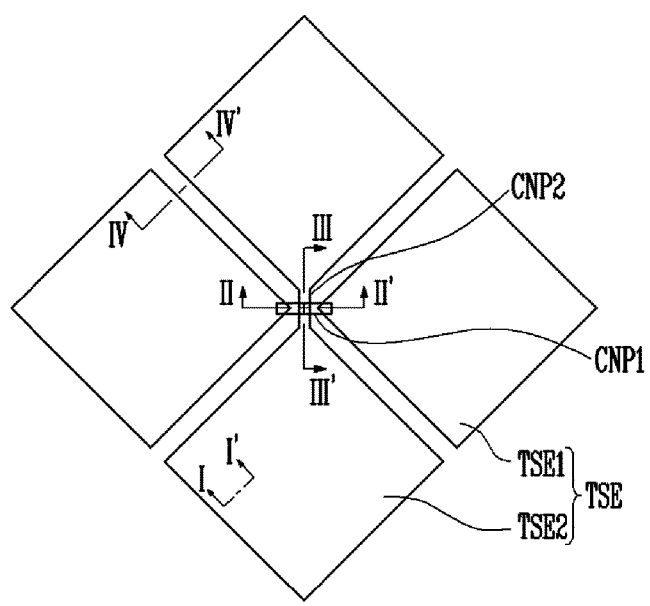
FIG. 3 is a partial enlarged view illustrating touch sensing electrodes of the touch sensor shown in FIG. 2 according to some exemplary embodiments.
Figure 4:
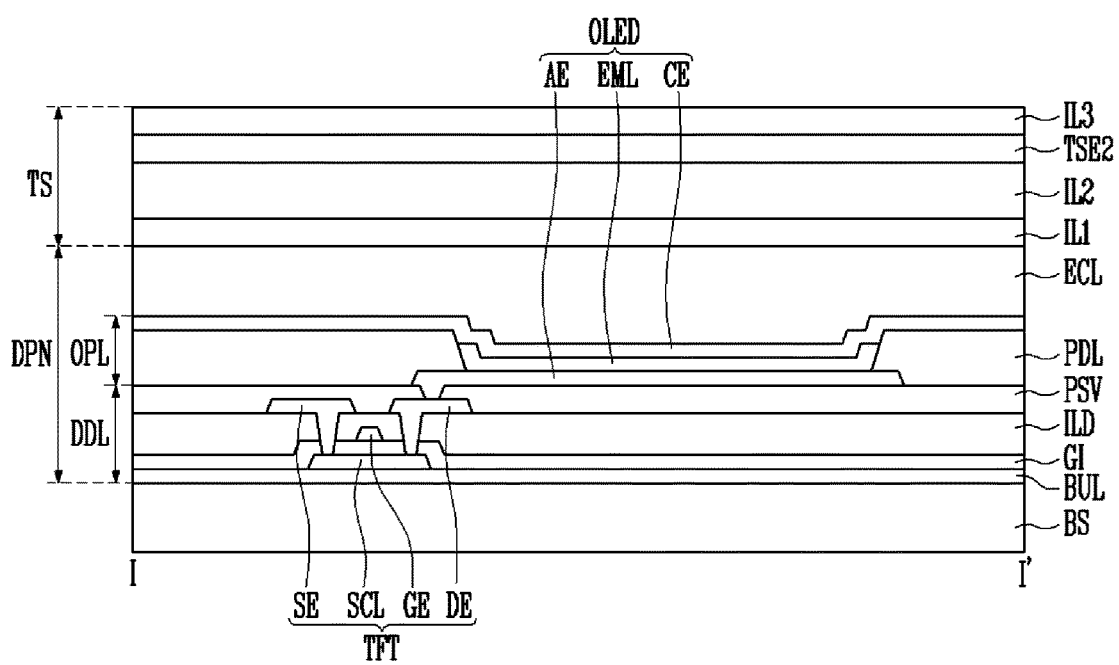
FIG. 4 is a sectional view taken along sectional line I-I' of FIG. 3 according to some exemplary embodiments.
Figure 5:
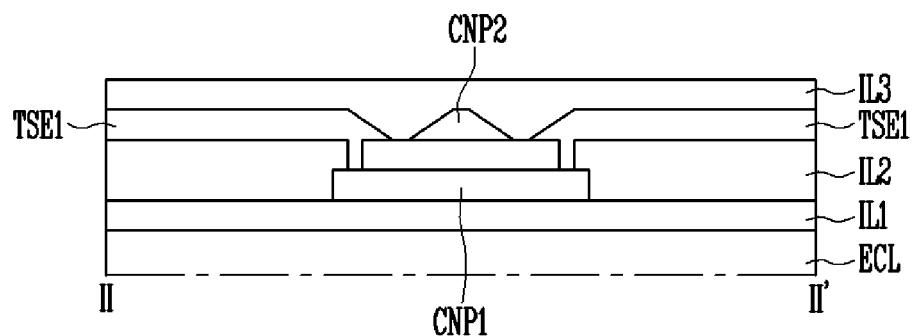
FIG. 5 is a sectional view taken along sectional line II-II' of FIG. 3 according to some exemplary embodiments.
Figure 6:
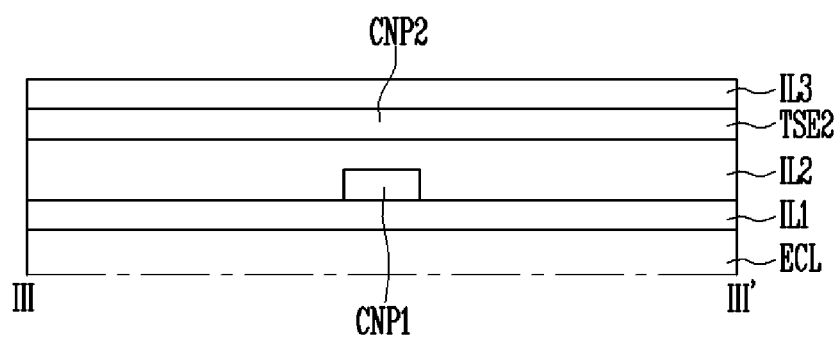
FIG. 6 is a sectional view taken along sectional line III-III' of FIG. 3 according to some exemplary embodiments.
Figure 7:
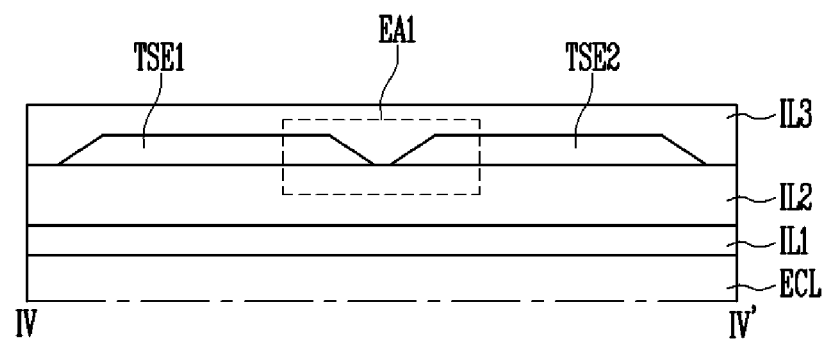
FIG. 7 is a sectional view taken along sectional line IV-IV' of FIG. 3 according to some exemplary embodiments.
Figure 8:
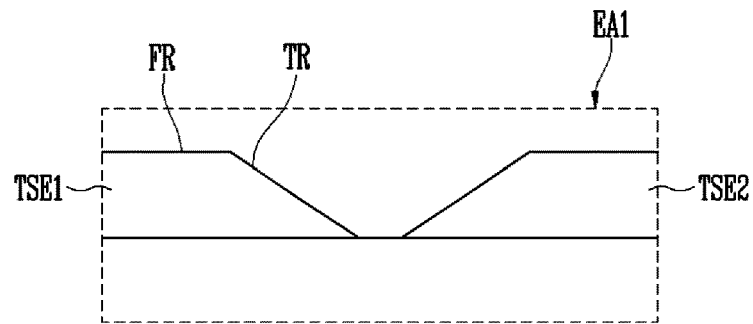
FIG. 8 is an enlarged view of area EA1 of FIG. 7 according to some exemplary embodiments.

FIG. 1 is a perspective view illustrating a display device including a touch sensor according to some exemplary embodiments. FIG. 2 is a plan view schematically illustrating the touch sensor of FIG. 1 according to some exemplary embodiments. FIG. 3 is a partial enlarged view illustrating touch sensing electrodes of the touch sensor shown in FIG. 2 according to some exemplary embodiments. FIG. 4 is a sectional view taken along sectional line I-I' of FIG. 3 according to some exemplary embodiments. FIG. 5 is a sectional view taken along sectional line II-II' of FIG. 3 according to some exemplary embodiments. FIG. 6 is a sectional view taken along sectional line III-III' of FIG. 3 according to some exemplary embodiments. FIG. 7 is a sectional view taken along sectional line IV-IV' of FIG. 3 according to some exemplary embodiments. FIG. 8 is an enlarged view of area EA1 of FIG. 7 according to some exemplary embodiments.

Referring to FIGS. 1 to 8, the display device may include a display panel DPN and a touch sensor TS.

The display panel DPN may display an image. The display panel DPN is not limited to a particular structure. For example, a spontaneous emission display panel, such as an organic light-emitting display (OLED) panel, may be used as the display panel DPN. In some exemplary embodiments, a non-light emitting display panel, such as a liquid crystal display (LCD) panel, an electrophoretic display (EPD) panel, or an electrowetting display (EWD) panel may be used as the display panel DPN. In the case where a non-light emitting display panel is used as the display panel DPN, the display device may include a backlight unit configured to supply light to the display panel DPN. For illustrative and descriptive convenience, the display panel DPN will be described as an OLED panel.

The display panel DPN may include a display area (not shown) and a non-display area (not shown). The display area may include a plurality of pixels. The non-display area may be disposed adjacent to the display area. For example, the non-display area may be provided in a form that encloses the display area. Each pixel may be any one of a colored pixel, such as a red pixel, a green pixel, a blue pixel, and a white pixel; however, the type of each pixel is not limited. For instance, the pixel may be any one of a magenta pixel, a cyan pixel, and a yellow pixel. Each pixel may include a display element OLED. The display element OLED may be an organic light-emitting diode.

The display panel DPN may include a base substrate BS, a drive layer DDL provided on the base substrate BS, an optical layer OPL provided on the drive layer DDL, and an encapsulating layer ECL provided on the optical layer OPL.

The base substrate BS may include a display area and a non-display area. Pixel areas in which the pixels are disposed may be provided in the display area. The non-display area may be disposed adjacent to the display area.

The base substrate BS may include a transparent insulating material, and thus, allow light to pass therethrough. The base substrate BS may be formed of a rigid substrate or a flexible substrate. Examples of the rigid substrate may include a glass substrate, a quartz substrate, a glass ceramic substrate, and a crystalline glass substrate. Examples of the flexible substrate may include a film substrate and a plastic substrate, each of which includes, for instance, a polymer organic material. For example, the flexible substrate may include one of polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), triacetate cellulose (TAC), and cellulose acetate propionate (CAP). The flexible substrate may include fiber glass reinforced plastic (FRP). The material applied as the base substrate BS may have resistance (e.g., thermal resistance) to high treatment temperatures during a process of fabricating the display device.

The drive layer DDL may be provided on the base substrate BS, and may include at least one thin film transistor TFT provided in each pixel area. Furthermore, the drive layer DDL may include a buffer layer BUL provided between the base substrate BS and the thin film transistor TFT. The buffer layer BUL may include inorganic insulating material. For example, the buffer layer BUL may include at least one of silicon oxide, silicon nitride, and silicon oxynitride. Furthermore, the buffer layer BUL may have a single-layer structure or a multilayer structure. For example, the buffer layer BUL may have a single-layer structure including any one of silicon oxide, silicon nitride, and silicon oxynitride. The buffer layer BUL may include a silicon oxide layer and a silicon nitride layer disposed on the silicon oxide layer. The buffer layer BUL may include three or more insulating layers that are successively stacked. The buffer layer BUL may prevent (or reduce) impurities from diffusing from the base substrate BS to the thin film transistor TFT. Furthermore, the buffer layer BUL may planarize the surface of the base substrate BS.

The thin film transistor TFT may be coupled to a gate line (not shown) and a data line (data line). The thin film transistor TFT may include a semiconductor layer SCL, a gate electrode GE, a source electrode SE, and a drain electrode DE.

The semiconductor layer SCL may be disposed on the buffer layer BUL. The semiconductor layer SCL may include any one of amorphous silicon (Si), polycrystalline silicon (Si), an oxide semiconductor, and an organic semiconductor. Areas on the semiconductor layer SCL that are coupled to the source electrode SE and the drain electrode DE may be a source area and a drain area with or into which impurities have been doped or injected. An area between the source area and the drain area may be a channel area. Although not shown, if the semiconductor layer SCL includes an oxide semiconductor, a light blocking layer may be disposed on or under the semiconductor layer SCL to block light from being incident on the semiconductor layer SCL.

A gate insulating layer GI may be disposed on the semiconductor layer SCL. The gate insulating layer GI may cover the semiconductor layer SCL and insulate the semiconductor layer SCL from the gate electrode GE. The gate insulating layer GI may include at least one of an organic insulating material and an inorganic insulating material. For example, the gate insulating layer GI may include at least one of silicon oxide and silicon nitride.

The gate electrode GE may be disposed on the gate insulating layer GI. The gate electrode GE may be coupled to the gate line. The gate electrode GE may include a low-resistance conductive material and may overlap the semiconductor layer SCL.

An interlayer insulating layer ILD may be disposed on the gate electrode GE. The interlayer insulating layer ILD may include at least one of an organic insulating material and an inorganic insulating material. For example, the interlayer insulating layer ILD may include at least one of silicon oxide and silicon nitride. The interlayer insulating layer ILD may insulate the source electrode SE, the drain electrode DE, and the gate electrode GE from each other.

Contact holes that pass through the gate insulating layer GI and the interlayer insulating layer ILD may expose the source area and the drain area of the semiconductor layer SCL. The source electrode SE and the drain electrode DE may be disposed on the interlayer insulating layer ILD at positions spaced apart from each other. Each of the source electrode SE and the drain electrode DE may include a low-resistance conductive material. One end of the source electrode SE may be coupled to the data line. Another end of the source electrode SE may be coupled to the source area through one of the contact holes. One end of the drain electrode DE may be coupled to the drain area through another one of the contact holes. Another end of the drain electrode DE may be coupled to the display element OLED.

Although the thin film transistor TFT is shown as a thin film transistor of a top gate structure, exemplary embodiments are not limited thereto. For example, the thin film transistor TFT may be a thin film transistor having a bottom gate structure, a dual gate structure, and/or the like.

The drive layer DDL may include a protective layer PSV provided on the thin film transistor TFT. The protective layer PSV may cover the thin film transistor TFT. A portion of the protective layer PSV is removed to expose one of the source electrode SE and the drain electrode DE, for example, to expose the drain electrode DE.

The protective layer PSV may include at least one layer. For example, the protective layer PSV may include an inorganic protective layer and an organic protective layer disposed on the inorganic protective layer. The inorganic protective layer may include at least one of silicon oxide and silicon nitride. The organic protective layer may include one of acryl, polyimide (PI), polyamide (PA), and benzocyclobutene (BCB). Furthermore, the organic protective layer may be a planarization layer that is transparent and flexible, and thus, makes it possible to mitigate unevenness of a lower structure and planarize the lower structure.

The optical layer OPL may be provided on the protective layer PSV and include a display element OLED that is coupled to the drain electrode DE. The display element OLED may include a first electrode AE coupled to the drain electrode DE, a light-emitting layer EML disposed on the first electrode AE, and a second electrode CE disposed on the light-emitting layer EML. Any one of the first electrode AE and the second electrode CE may be an anode electrode, and the other may be a cathode electrode. For example, the first electrode AE may be an anode electrode, and the second electrode CE may be a cathode electrode.

Furthermore, at least one of the first electrode AE and the second electrode CE may be a transmitting electrode. For example, in the case where the display element OLED is a bottom emitting type organic light-emitting element, the first electrode AE may be a transmissive electrode, and the second electrode CE may be a reflective electrode. In the case where the display element OLED is a top emitting type organic light-emitting element, the first electrode AE may be a reflective electrode, and the second electrode CE may be a transmitting electrode. In the case where the display element OLED is a both-side emitting type organic light-emitting element, both the first electrode AE and the second electrode CE may be transmitting electrodes. For descriptive and illustrative convenience, a case where the display element OLED is a top emitting type organic light-emitting element and the first electrode AE is an anode electrode are described and illustrated.

In each pixel area, the first electrode AE may be disposed on the protective layer PSV. The first electrode AE may include a reflective layer (not shown) that reflects light, and a transparent conductive layer (not shown) disposed on or under the reflective layer. At least one of the transparent conductive layer and the reflective layer may be coupled with the drain electrode DE.

The reflective layer may include a material that is able to reflect light. For example, the reflective layer may include at least one of aluminum (Al), silver (Ag), chrome (Cr), molybdenum (Mo), platinum (Pt), nickel (Ni), and an alloy thereof.

The transparent conductive layer may include transparent conductive oxide. For example, the transparent conductive layer may include at least one transparent conductive oxide of indium tin oxide (ITO), indium zinc oxide (IZO), aluminum zinc oxide (AZO), gallium doped zinc oxide (GZO), zinc tin oxide (ZTO), gallium tin oxide (GTO), and fluorine doped tin oxide (FTO). It is also contemplated that a conductive polymer may be utilized.

A pixel defining layer PDL may be disposed on the first electrode AE. The pixel defining layer PDL may be disposed between the pixel areas and expose a portion of the first electrode AE. Furthermore, the pixel defining layer PDL may overlap an edge of the first electrode AE. Therefore, the pixel defining layer PDL may expose most of the area of the surface of the first electrode AE that faces the second substrate 120. The pixel defining layer PDL may include an organic insulating material. For example, the pixel defining layer PDL may include at least one of polystyrene, polymethylmethacrylate (PMMA), polyacrylonitrile (PAN), polyamide (PA), polyimide (PI), polyarylether (PAE), heterocyclic polymer, parylene, epoxy, benzocyclobutene (BCB), siloxane-based resin, and silane-based resin.

The light-emitting layer EML may be disposed on the exposed surface of the first electrode AE. The light-emitting layer EML may have a multilayer thin-film structure including at least a light generation layer (LGL). For instance, the light-emitting layer EML may include: a hole injection layer (HIL) into which holes are injected; a hole transport layer (HTL) that has excellent hole transportation performance and restrains movement of electrons that have not been coupled with holes in the light generation layer, and thus, increases chances of recombination between holes and electrons; the light generation layer that emits light by recombination between injected electrons and holes; a hole blocking layer (HBL) that restrains movement of holes that have not been coupled with electrons in the light generation layer; an electron transport layer (ETL) provided to smoothly transport electrons to the light generation layer; and an electron injection layer (EIL) into which electrons are injected. The hole injection layer, the hole transport layer, the hole blocking layer, the electron transport layer, and the electron injection layer may be common layers coupled between adjacent pixel areas.

The color of light generated from the light generation layer may be one of red, green, blue and white, but exemplary embodiments are not limited thereto. For example, the color of light generated from the light generation layer of the light-emitting layer EML may be one of magenta, cyan, and yellow.

The second electrode CE may be disposed on the light-emitting layer EML. The second electrode CE may be a semi-transmitting reflective layer. For example, the second electrode CE may be a thin metal layer having a thickness allowing light to pass therethrough. The second electrode CE may allow some of the light generated from the light generation layer to pass therethrough and may reflect the rest of the light generated from the light generation layer. The second electrode CE may include a material having a work function lower than that of the transparent conductive layer. For instance, the second electrode CE may include at least one of molybdenum (Mo), tungsten (W), silver (Ag), magnesium (Mg), aluminum (Al), platinum (Pt), palladium (Pd), gold (Au), nickel (Ni), neodymium (Nd), iridium (Ir), chrome (Cr), lithium (Li), calcium (Ca), and an alloy thereof.

Some of the light emitted from the light-emitting layer EML may not transmit through the second electrode CE, and light reflected by the second electrode CE may be reflected by the reflective layer again. That is, light emitted form the light-emitting layer EML may resonate between the reflective layer and the second electrode CE. The light extraction efficiency of the display element OLED may be enhanced by the resonance of light.

The distance between the reflective layer and the second electrode CE may change depending on the color of light generated from the light generation layer. That is, depending on the color of light generated from the light generation layer, the distance between the reflective layer and the second electrode CE may be adjusted to correspond to a resonance distance.

The encapsulating layer ECL may be provided on the second electrode CE. The encapsulating layer ECL may cover the display element OLED and prevent (or reduce) oxygen or water from permeating the display element OLED. The encapsulating layer ECL may include a plurality of insulating layers. For instance, the encapsulating layer ECL may include a plurality of inorganic layers (not shown) and a plurality of organic layers (not shown). In addition, the encapsulating layer ECL may include a plurality of encapsulating units, each of which includes an inorganic layer and an organic layer disposed on the inorganic layer. The inorganic layer may include at least one of silicon oxide, silicon nitride, silicon oxynitride, aluminum oxide, titanium oxide, zirconium oxide, and tin oxide. The organic layer may include at least one of acryl, polyimide (PI), polyamide (PA), and benzocyclobutene (BCB).

The touch sensor TS may be disposed on a surface of the display panel DPN. For example, the touch sensor TS may be provided on the encapsulating layer ECL.

The touch sensor TS may include a sensing area SA that may sense a touch location of the user, and a non-sensing area NSA disposed adjacent to the sensing area SA. The sensing area SA may correspond to the display area of the display panel DPN. The non-sensing area NSA may correspond to the non-display area.

The touch sensor TS may include a plurality of sensing electrodes TSE provided in the sensing area SA, and sensing lines SL provided in the non-sensing area NSA and configured to couple the sensing electrodes TSE to a pad unit PDA. The sensing lines SL may be coupled to respective pads PD of the pad unit PDA.

The touch sensor TS may be a mutual capacitance touch sensor. In other words, the touch sensor TS may sense the touch location of the user by sensing a change in capacitance between adjacent sensing electrodes TSE. For this operation, some of the sensing electrodes TSE may be arranged in one direction and electrically coupled with each other, thus forming a plurality of sensing rows parallel with each other. The sensing electrodes TSE included in the sensing rows may be first sensing electrodes TSE1. In the sensing rows, adjacent first sensing electrodes TSE1 may be electrically coupled with each other through a first connection pattern CNP1. The other sensing electrodes TSE may be arranged in a direction intersecting with the sensing rows and electrically coupled with each other, thus forming a plurality of sensing columns parallel with each other. The sensing electrodes TSE included in the sensing columns may be second sensing electrodes TSE2. In the sensing columns, adjacent second sensing electrodes TSE2 may be electrically coupled with each other through a second connection pattern CNP2. The sensing columns and the sensing rows may be electrically coupled to the corresponding pads PD through the sensing lines SL.

The touch sensor TS may include a first insulating layer IL1, a first conductive layer provided on the first insulating layer IL1, a second insulating layer IL2 configured to cover the first conductive layer, a second conductive layer provided on the second insulating layer IL2, and a third insulating layer IL3 configured to cover the second conductive layer.

The first insulating layer IL1 may be provided on the encapsulating layer ECL. The first insulating layer IL1 may include at least one of an organic insulating material and an inorganic insulating material. For example, the first insulating layer IL1 may include at least one of silicon oxide, silicon nitride, and silicon oxynitride. In the case where an uppermost layer of the encapsulating layer ECL includes an inorganic insulating material, the first insulating layer IL1 may be omitted.

The first conductive layer may include the first connection pattern CNP1. The first conductive layer may include a conductive material. The first conductive layer may include a single conductive material layer. The conductive material layer may include transparent conductive oxide or metal. The first conductive layer may include a plurality of metal layers which are stacked. For example, the first conductive layer may include a first metal layer provided on the first insulating layer IL1, a second metal layer provided on the first metal layer, and a third metal layer provided on the second metal layer.

The second insulating layer IL2 may be provided on the first insulating layer IL1 and the first conductive layer. The second insulating layer IL2 may include the same material as that of the first insulating layer IL1 For example, the second insulating layer IL2 may include at least one of silicon oxide, silicon nitride, and silicon oxynitride.

The second conductive layer may include a single conductive material layer in the same manner as that of the first conductive layer, or may include a plurality of conductive material layers. The second conductive layer may include the first sensing electrodes TSE1, the second sensing electrodes TSE2, and the second connection pattern CNP2. At least a portion of each of the first sensing electrodes TS1 and the second sensing electrodes TSE2 may have a tapered shape. For example, each of the first sensing electrodes TS1 and the second sensing electrodes TSE2 may include a first region FR having a flat surface, and a second region TR provided around the perimeter of the first region FR. The surface of the second region TR may be inclined relative to the surface of the first region FR. Because the second region TR is provided around the perimeter of the first region FR, the second regions TR of adjacent first sensing electrodes TSE1 and second sensing electrodes TSE2 may face each other.

Generally, in a mutual capacitance touch sensor, a horizontal electric field is formed between adjacent sensing electrodes. The capacitance of a capacitor formed by the horizontal electric field is smaller than the capacitance of a capacitor formed by a vertical electric field.

According to some exemplary embodiments, the second regions TR of the adjacent first sensing electrodes TSE1 and the second sensing electrodes TSE2 may face each other. When the second regions TR of the adjacent first sensing electrodes TSE1 and second sensing electrodes TSE2 face each other, the vertical electric field may be formed between the second regions TR of the adjacent first sensing electrodes TSE1 and second sensing electrodes TSE2. Due to the vertical electric field, the capacitance of the capacitor formed between the adjacent first sensing electrodes TSE1 and second sensing electrodes TSE2 may be increased. If the capacitance of the capacitor formed between the adjacent first sensing electrodes TSE1 and second sensing electrodes TSE2 is increased, the touch sensitivity of the touch sensor TS may be enhanced.

The edge of the second connection pattern CNP2 may also have a tapered shape.

The third insulating layer IL3 may be provided on the second insulating layer IL2 and the second conductive layer. The third insulating layer IL3 may prevent (or reduce) the second conductive layer from being exposed to the outside, thus preventing (or reducing) the second conductive layer from being corroded. The third insulating layer IL3 may include an organic insulating material. For example, the third insulating layer IL3 may include at least one of acryl, polyimide (PI), polyamide (PA), and benzocyclobutene (BCB). The third insulating layer IL3 may be transparent and flexible, thus making it possible to mitigate unevenness of a lower structure and planarize the lower structure.

Figure 9:
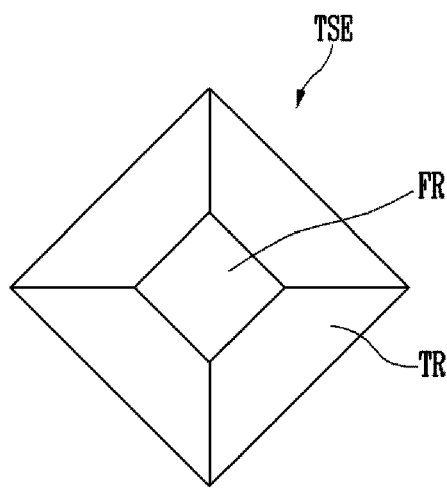
FIGS. 9, 10 and 11 are plan views illustrating first sensing electrodes and second sensing electrodes of FIGS. 1 to 8 according to some exemplary embodiments.
Figure 10:
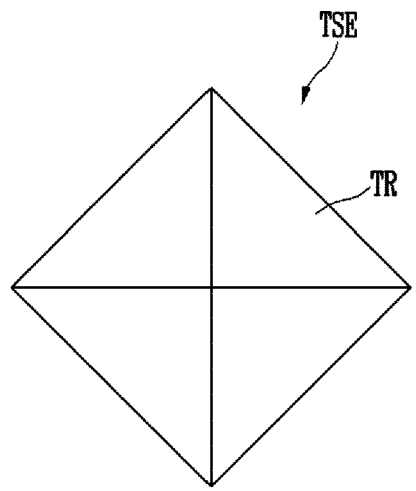
Figure 11:
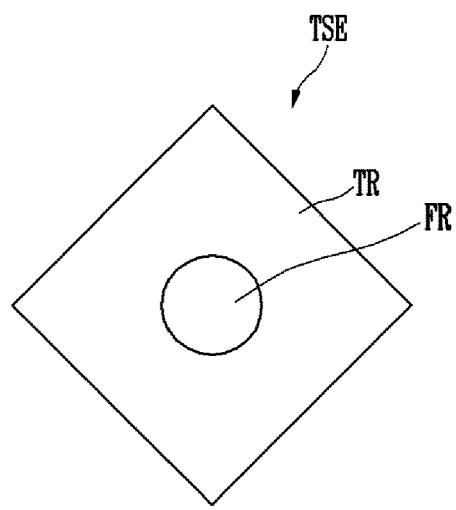

FIGS. 9 to 11 are plan views illustrating first sensing electrodes and second sensing electrodes of FIGS. 1 to 8 according to some exemplary embodiments.

Referring to FIGS. 9 to 11, at least a portion of each of the first sensing electrodes TSE1 and the second sensing electrodes TSE2 may have a tapered shape. For example, each of the first sensing electrodes TSE1 and the second sensing electrodes TSE2 may include a first region FR and a second region TR provided around the perimeter of the first region FR.

The first region FR may be provided inside each of the first sensing electrodes TSE1 and the second sensing electrodes TSE2. The first region FR may have various shapes. For example, the first region FR may have a polygonal shape corresponding to the shape of each of the first sensing electrodes TSE1 and the second sensing electrodes TSE2. The first region FR may have a circular or elliptical shape.

The area of the first region FR may be smaller than that of each of the first sensing electrodes TSE1 and the second sensing electrodes TSE2. For example, as shown in FIG. 10, the area of the first region FR may be zero. The smaller the area of the first region FR, the larger the area of the second region TR. Therefore, the capacitance of a capacitor formed between adjacent first sensing electrodes TSE1 and second sensing electrodes TSE2 may be increased.

FIGS. 12 to 15 are sectional views illustrating a display device at various stages of manufacture according to some exemplary embodiments. For descriptive and illustrative convenience, FIGS. 12 to 15 illustrate a configuration formed on the encapsulating layer ECL of the display panel DPN of FIGS. 1 to 8.

Figure 12:
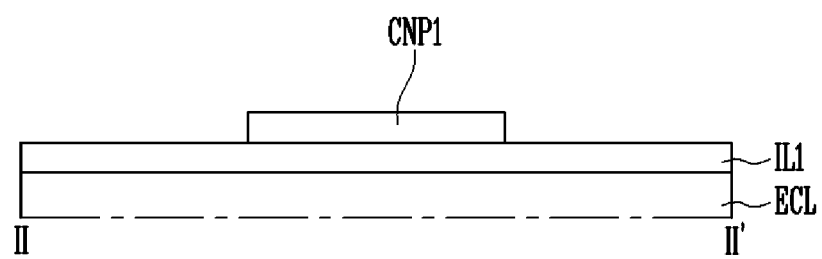
FIGS. 12, 13, 14, and 15 are sectional views illustrating a display device at various stages of manufacture according to some exemplary embodiments.

Referring to FIG. 12, a display panel DPN may be fabricated first. As shown in FIG. 4, the display panel DPN may include a base substrate BS, a drive layer DDL provided on the base substrate BS, an optical layer OPL provided on the drive layer DDL, and an encapsulating layer ECL provided on the optical layer OPL.

The base substrate BS may include a transparent insulating material, and thus, allow light to pass therethrough. Furthermore, the base substrate BS may be formed of a rigid substrate or a flexible substrate.

The drive layer DDL may be provided on the base substrate BS and include at least one thin film transistor TFT provided in each pixel area. Furthermore, the drive layer DDL may include a buffer layer BUL provided between the base substrate BS and the thin film transistor TFT. The drive layer DDL may include a protective layer PSV provided on the thin film transistor TFT.

The optical layer OPL may be provided on the protective layer PSV and include a display element OLED, which is coupled to the drain electrode DE of the thin film transistor TFT. The display element OLED may include a first electrode AE coupled to the drain electrode DE, a light-emitting layer EML disposed on the first electrode AE, and a second electrode CE disposed on the light-emitting layer EML.

The encapsulating layer ECL may be provided on the second electrode CE. The encapsulating layer ECL may prevent (or reduce) oxygen or moisture from permeating the display element OLED. The encapsulating layer ECL may include a plurality of inorganic layers (not shown) and a plurality of organic layers (not shown).

After the display panel DPN has been fabricated, a first insulating layer IL1 may be formed on the display panel DPN. For example, the first insulating layer IL1 may be formed on the encapsulating layer ECL. The first insulating layer IL1 may include at least one of an organic insulating material and an inorganic insulating material. For instance, the first insulating layer IL1 may include at least one of silicon oxide, silicon nitride, and silicon oxynitride. In the case where the uppermost layer (e.g., a layer furthest from the base substrate BS) of the encapsulating layer ECL includes an inorganic insulating material, the first insulating layer IL1 may be omitted.

After the first insulating layer IL1 has been formed, a first conductive layer may be formed on the first insulating layer IL1 The first conductive layer may be formed by applying conductive material and patterning it. The first conductive layer may include a first connection pattern CNP1. In sensing rows or sensing columns including sensing electrodes TSE, the first connection pattern CNP1 may electrically couple adjacent sensing electrodes TSE with each other.

Figure 13:
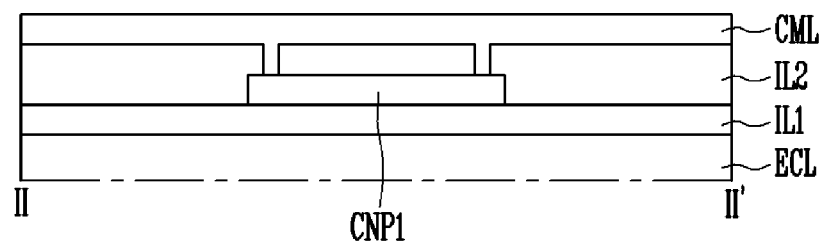

Referring to FIG. 13, after the first conductive layer has been formed, a second insulating layer IL2 may be formed on the first conductive layer and the first insulating layer IL1. The second insulating layer IL2 may be provided on the first insulating layer IL1 and the first conductive layer. The second insulating layer IL2 may include the same material as that of the first insulating layer IL1.

After the second insulating layer IL2 has been formed, contact holes may be formed by patterning the second insulating layer IL2 so that portions of the first connection pattern CNP1, e.g., opposite end portions of the first connection pattern CNP1, are exposed through the contact holes. After the contact holes have been formed, a conductive material layer CML may be formed on the second insulating layer IL2.

Figure 14:
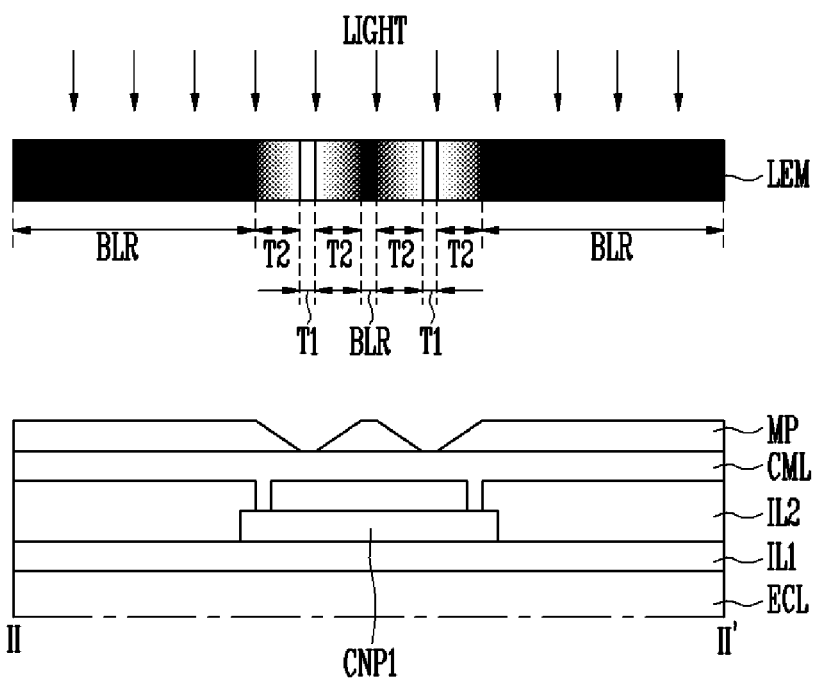

Referring to FIG. 14, after the conductive material layer CML has been formed, a mask pattern MP may be formed on the conductive material layer CML. The mask pattern MP may be formed by forming, on the conductive material layer CML, a photosensitive material layer including photosensitive material, and then exposing and developing the photosensitive material layer. The mask pattern MP may include positive photoresist or negative photoresist. Hereinbelow, for the sake of description, there will be illustrated and described an example in which the mask pattern MP includes positive photoresist.

The light exposure operation may be performed by applying light to the photosensitive material layer through a light exposure mask LEM. The light exposure mask LEM may be a halftone mask that varies in light transmittance depending on regions. The light exposure mask LEM may be a slit mask that varies in the number of slits allowing light to pass therethrough depending on regions. In other words, the light exposure mask LEM may include a plurality of regions having different light transmittances. For example, the light exposure mask LEM may include a first light transmitting region T1 that allows light emitted from a light source to pass therethrough, a second light transmitting region T2 that allows some of the light emitted from the light source to pass therethrough, and a light blocking region BLR that blocks the light emitted from the light source. In other words, the light transmittance of the first light transmitting region T1 may be higher than that of the second light transmitting region T2.

The second light transmitting region T2 may be disposed between the first light transmitting region T1 and the light blocking region BLR. The second light transmitting region T2 may be increased or reduced in light transmittance from one end thereof to the other end. For example, the closer to the first light transmitting region T1, the higher the light transmittance in the second light transmitting region T2. The closer to the light blocking region BLR, the lower the light transmittance in the second light transmitting region T2. Therefore, the mask pattern MP developed after the photosensitive material has been exposed may have a tapered shape in a region thereof corresponding to the second light transmitting region T2.

Figure 15:
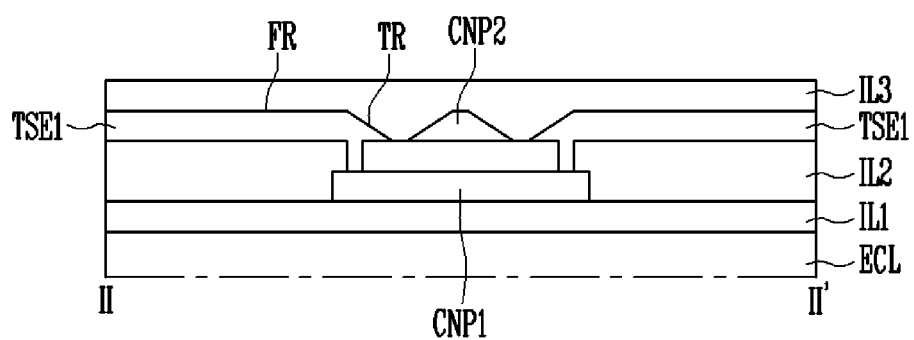

Referring to FIG. 15, after the mask pattern MP has been formed, a second conductive layer may be formed by patterning the conductive material layer CML. The operation of patterning the conductive material layer CML may be an etching process using the mask pattern MP as a mask. The second conductive layer formed by patterning the conductive material layer CML may include first sensing electrodes TSE1, second sensing electrodes TSE2, and a second connection pattern CNP2.

The first sensing electrodes TSE1 may be arranged in one direction and be electrically coupled with each other, thus forming any one of the sensing rows and the sensing columns, for example, forming the sensing rows. Here, adjacent first sensing electrodes TSE1 may be electrically coupled to the first connection pattern CNP1 through the contact holes. Therefore, in each sensing row, the adjacent first sensing electrodes TSE1 may be electrically coupled with each other.

The second sensing electrodes TSE2 may be arranged in a direction intersecting the direction in which the first sensing electrodes TSE1 are arranged, and may be electrically coupled with each other, thus forming any one of the sensing rows and the sensing columns, for example, forming the sensing columns. In the sensing columns, adjacent second sensing electrodes TSE2 may be electrically coupled with each other through a second connection pattern CNP2. Therefore, in each sensing column, the adjacent second sensing electrodes TSE2 may be electrically coupled with each other.

Since the region of the mask pattern MP that corresponds to the second light transmitting region T2 has a tapered shape, regions of the first sensing electrodes TSE1 and the second sensing electrodes TSE2 and the second connection pattern CNP2 that correspond to the second light transmitting region T2 may also have tapered shapes. Since the region of the mask pattern MP that corresponds to the first light transmitting region T1 has a flat shape, regions of the first sensing electrodes TSE1 and the second sensing electrodes TSE2 and the second connection pattern CNP2 that correspond to the first light transmitting region T1 may also have planar shapes. Therefore, each of the first sensing electrodes TSE1 and the second sensing electrodes TSE2 and the second connection pattern CNP2 that are formed through the etching process using the mask pattern MP may include a first region FR having a flat surface and a second region TR disposed around the perimeter of the first region FR. The first region FR may be a region corresponding to the first light transmitting region T1. The second region TR may be a region corresponding to the second light transmitting region T2. The second region TR may have a shape in which it is inclined relative to the surface of the first region FR.

After the second conducive layer has been formed, a third insulating layer IL3 may be formed to cover the second conductive layer. The third insulating layer IL3 may prevent (or reduce) the second conductive layer from being exposed to the outside, thus preventing (or reducing) the second conductive layer from being corroded. The third insulating layer IL3 may include organic insulating material.

Figure 16A:
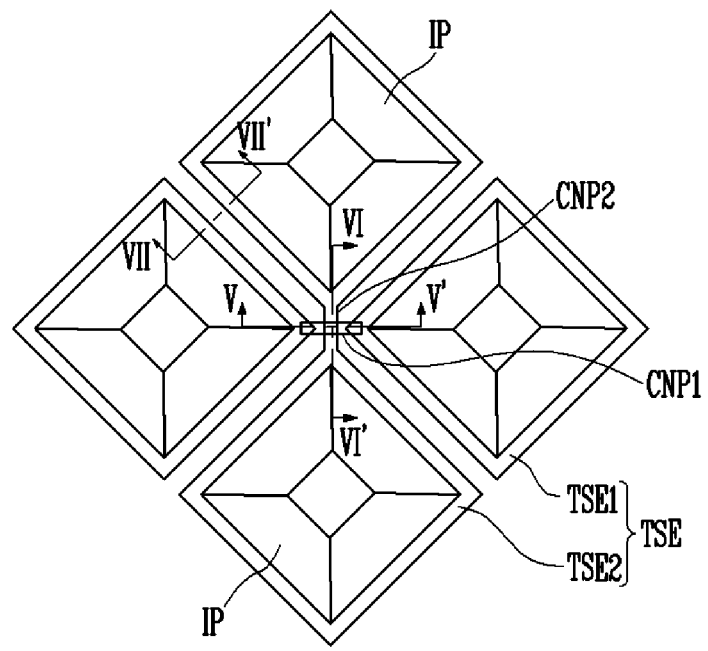
Figure 16B:
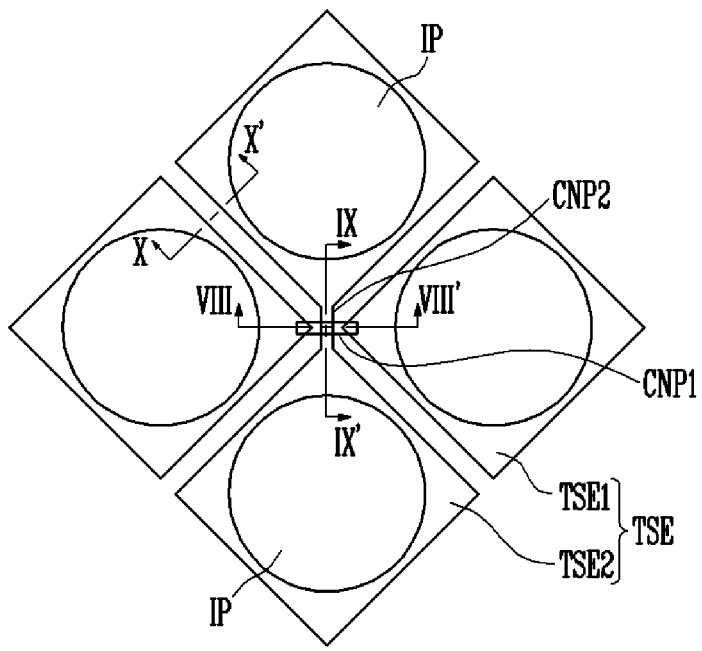
Figure 18A:
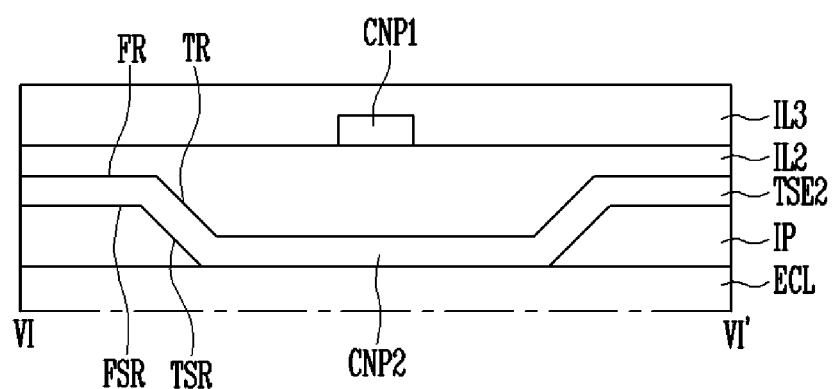
Figure 18B:
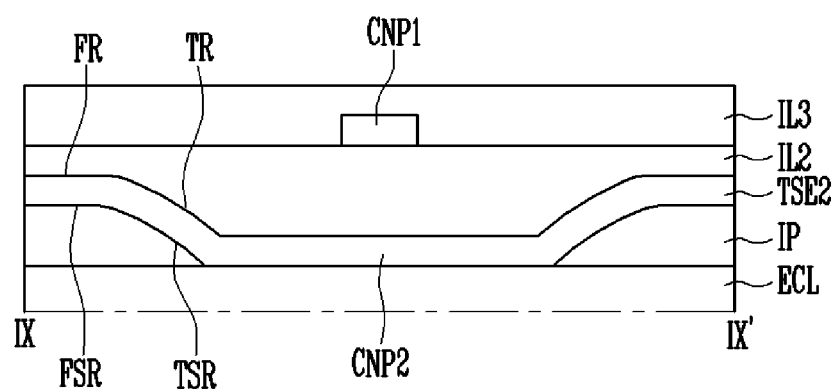
Figure 19A:
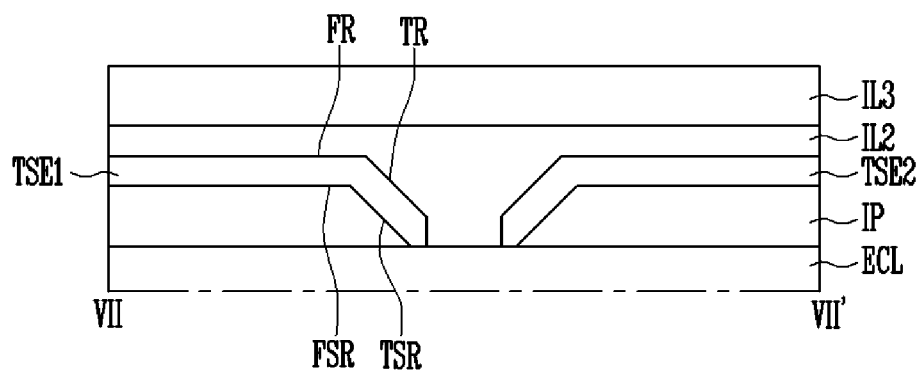
Figure 19B:
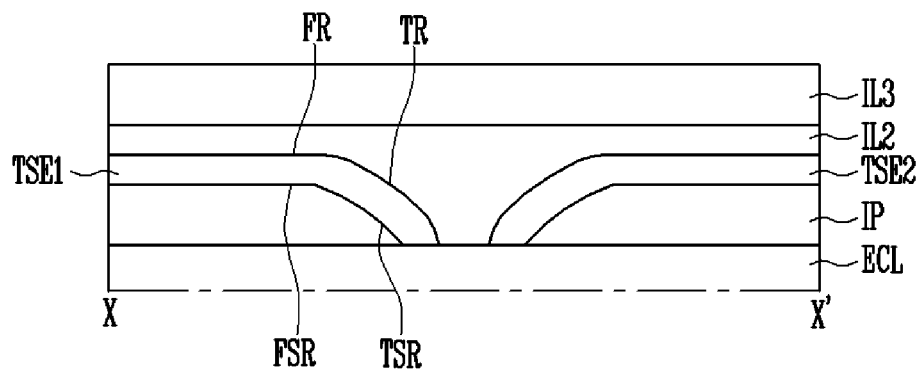

FIGS. 16A, 16B, 17A, 17B, 18A, 18B, 19A, and 19B are views illustrating a display device according to some exemplary embodiments. FIGS. 16A and 16B are partial enlarged views illustrating the touch sensing electrodes TSE of the touch sensor TS shown in FIG. 2. FIG. 17A is a sectional view taken along sectional line V-V' of FIG. 16A according to some exemplary embodiments. FIG. 18A is a sectional view taken along sectional line VI-VI' of FIG. 16A according to some exemplary embodiments. FIG. 19A is a sectional view taken along sectional line VII-VII' of FIG. 16A according to some exemplary embodiments. FIG. 17B is a sectional view taken along sectional line VIII-VIII' of FIG. 16B according to some exemplary embodiments. FIG. 18B is a sectional view taken along sectional line IX-IX' of FIG. 16B according to some exemplary embodiments. FIG. 19B is a sectional view taken along sectional line X-X' of FIG. 16B according to some exemplary embodiments.

Referring to FIGS. 1, 2, 4, 16A, 16B, 16B, 17A, 17B, 18A, 18B, 19A, and 19B, the display device may include a display panel DPN and a touch sensor TS.

The display panel DPN may include a base substrate BS, a drive layer DDL provided on the base substrate BS, an optical layer OPL provided on the drive layer DDL, and an encapsulating layer ECL provided on the optical layer OPL.

The drive layer DDL may be provided on the base substrate BS and include at least one thin film transistor TFT provided in each pixel area. The thin film transistor TFT may include a semiconductor layer SCL, a gate electrode GE, a source electrode SE, and a drain electrode DE. The drive layer DDL may include a protective layer PSV provided on the thin film transistor TFT. The protective layer PSV may cover the thin film transistor TFT.

The optical layer OPL may be provided on the protective layer PSV and include the display element OLED that is coupled to the drain electrode DE. The display element OLED may include a first electrode AE coupled to the drain electrode DE, a light-emitting layer EML disposed on the first electrode AE, and a second electrode CE disposed on the light-emitting layer EML.

The encapsulating layer ECL may be provided on the second electrode CE. The encapsulating layer ECL may prevent (or reduce) oxygen or moisture from permeating the display element OLED. The encapsulating layer ECL may include a plurality of inorganic layers (not shown) and a plurality of organic layers (not shown).

The touch sensor TS may be disposed on a surface of the display panel DPN. For example, the touch sensor TS may be provided on the encapsulating layer ECL. The touch sensor TS may include a plurality of sensing rows and a plurality of sensing columns that intersect with each other. Each of the sensing rows may include first sensing electrodes TSE1 that are electrically coupled with each other by a first connection pattern CNP1. Each of the sensing columns may include second sensing electrodes TSE2 that are electrically coupled with each other by a second connection pattern CNP2.

The touch sensor TS may include a first insulating layer having a plurality of insulating patterns IP provided on the encapsulating layer ECL, a first conductive layer provided on the insulating patterns IP and the encapsulating layer ECL, a second insulating layer IL2 configured to cover the first conductive layer, a second conductive layer provided on the second insulating layer IL2, and a third insulating layer IL3 covering the second conductive layer.

The insulating patterns IP may be disposed on the encapsulating layer ECL at positions spaced apart from each other. The insulating patterns IP may include a transparent insulating material. The kind of material included in the insulating patterns IP may depend on the kind of material used to form an uppermost layer of the encapsulating layer ECL. For example, if the uppermost layer of the encapsulating layer ECL includes a hydrophilic or oleophobic material, the insulating patterns IP may include hydrophilic or oleophobic material. If the uppermost layer of the encapsulating layer ECL includes a hydrophobic or oleophilic material, the insulating patterns IP may include a hydrophobic or oleophilic material. In other words, solvent-related compatibility (hereinafter, referred to as "solvent compatibility") of the material included in the insulating patterns IP may be the same as that of the material included in the uppermost layer of the encapsulating layer ECL.

At least some surface of each insulating pattern IP may have a non-flat shape. For example, each insulating pattern IP may include a flat region FSR having a flat surface, and a non-flat region TSR formed around the perimeter of the flat region FSR. The surface of the non-flat region TSR may have a shape in which it couples a portion of the surface of the flat region FSR to a portion of the surface of the encapsulating layer ECL. For instance, as shown in FIGS. 17A, 18A, and 19A, the surface of the non-flat region TSR may be a surface that couples the surface of the flat region FSR to the encapsulating layer ECL. In other words, the surface of the non-flat region TSR may be a surface inclined to the surface of the flat region FSR. As another example, as shown in FIGS. 17B, 18B, and 19B, the surface of the non-flat region TSR may be a curved surface that couples the surface of the flat region FSR to the encapsulating layer ECL.

Each of the insulating patterns IP may have various planar shapes. For example, as shown in FIG. 16A, each insulating pattern IP may have a planar shape corresponding to the planar shape of the first sensing electrodes TSE1 and the second sensing electrodes TSE2. As shown in FIG. 16B, each insulating pattern IP may have a circular or elliptical planar shape.

The area of each insulating pattern IP may be the same as or different from that of each of the first sensing electrodes TSE1 and the second sensing electrodes TSE2. For example, the area of each insulating pattern IP may be smaller than that of each of the first sensing electrodes TSE1 and the second sensing electrodes TSE2. In FIGS. 16A and 16B, for the sake of description and illustration, there are illustrated examples in which the area of each insulating pattern IP is smaller than that of each of the first sensing electrodes TSE1 and the second sensing electrodes TSE2.

The first conductive layer may include the first sensing electrodes TSE1, the second sensing electrodes TSE2, and the second connection pattern CNP2.

The first sensing electrodes TSE1 and the second sensing electrodes TSE2 may cover the insulating patterns IP. Each of the first sensing electrodes TSE1 and the second sensing electrodes TSE2 may include a first region FR corresponding to the flat region FSR, and a second region TR corresponding to the non-flat region TSR. Therefore, the second region TR may be disposed around the perimeter of the first region FR. The first region FR may have a flat surface. The second region TR may have a shape corresponding to the surface of the non-flat region TSR. For instance, the surface of the second region TR may be a surface inclined with respect to the surface of the first region FR. In addition, the surface of the second region TR may have a curved shape.

When the second regions TR of adjacent first sensing electrodes TSE1 and second sensing electrodes TSE2 face each other, the capacitance of a capacitor formed between the adjacent first sensing electrodes TSE1 and second sensing electrodes TSE2 may be increased. It is noted that the area of the second region TR of each of the first sensing electrodes TSE1 and the second sensing electrodes TSE2 is increased as the area of the first region FR is reduced. Hence, the capacitance of the capacitor formed between the adjacent first sensing electrodes TSE1 and second sensing electrodes TSE2 may be increased. Therefore, the touch sensitivity of the touch sensor may be enhanced.

Adjacent second sensing electrodes TSE2 may be electrically coupled with each other through the second connection pattern CNP2.

The second insulating layer IL2 may cover the first conductive layer. The second insulating layer IL2 may include at least one of silicon oxide, silicon nitride, and silicon oxynitride. The second insulating layer IL2 may include a contact hole through which a portion of the second connection pattern CNP2 is exposed.

The second conductive layer may include the first connection pattern CNP1. Adjacent first sensing electrodes TSE1 may be electrically coupled with each other through the first connection pattern CNP1.

The third insulating layer IL3 may be provided on the second insulating layer IL2 and the second conductive layer. The third insulating layer IL3 may prevent (or reduce) the second conductive layer from being exposed to the outside, thus preventing (or reducing) the second conductive layer from being corroded.

Figure 20:
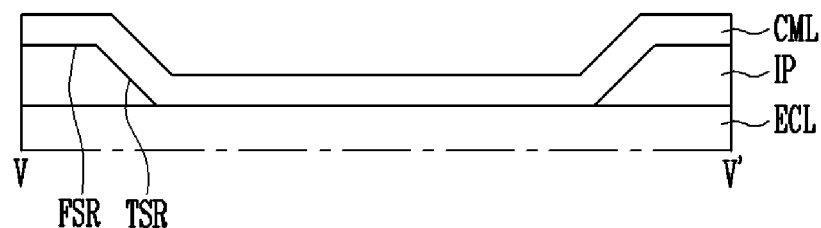
FIGS. 20, 21, and 22 are sectional views illustrating the display device of FIGS. 16A, 17A, 18A, and 19A at various stages of manufacture according to some exemplary embodiments.
Figure 21:
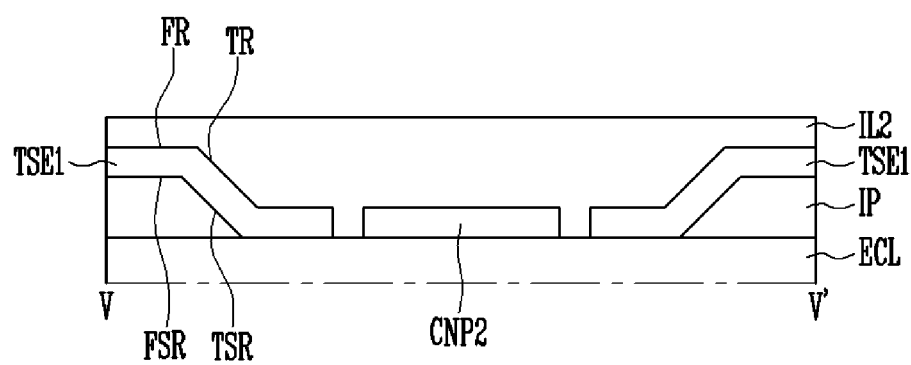
Figure 22:
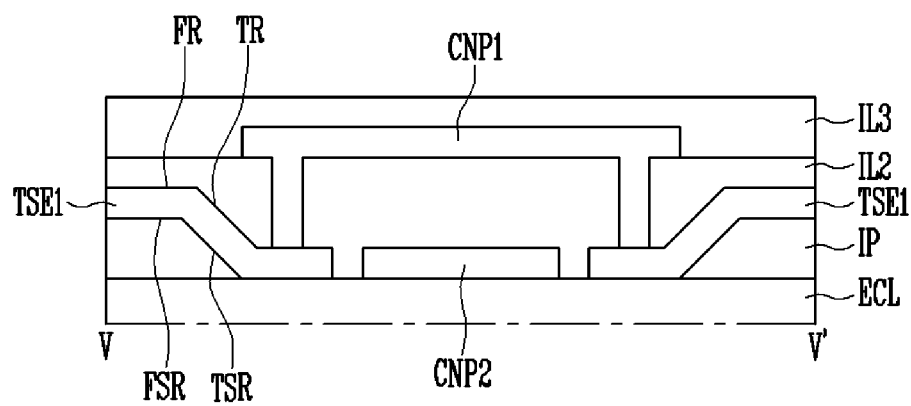

Hereinafter, a method of fabricating the display device shown in FIGS. 16A, 16B, 17A, 17B, 18A, 18B, 19A, and 19B will be described with reference to FIGS. 20 to 22. In FIGS. 20 to 22, for the sake of description and illustration, a description will be made for the display device shown in FIGS. 16A, 17A, 18A and 19A.

FIGS. 20 to 22 are sectional views illustrating the display device of FIGS. 16A, 17A, 18A, and 19A at various stages of manufacture according to some exemplary embodiments.

Referring to FIG. 20, a display panel DPN may be fabricated first. As shown in FIG. 4, the display panel DPN may include a base substrate BS, a drive layer DDL provided on the base substrate BS, an optical layer OPL provided on the drive layer DDL, and an encapsulating layer ECL provided on the optical layer OPL. The encapsulating layer ECL may include a plurality of inorganic layers (not shown) and a plurality of organic layers (not shown).

After the display panel DPN has been fabricated, the first insulating layer IL1 may be formed on the encapsulating layer ECL of the display panel DPN. For example, the first insulating layer may include a plurality of insulating patterns IP. At least a portion of each insulating pattern IP may have a tapered shape. For example, each insulating pattern IP may include a flat region FSR and a non-flat region TSR formed around the perimeter of the flat region FSR.

The insulating patterns IP may be formed by various methods. For example, the insulating patterns IP may be formed by forming an insulating material layer on the encapsulating layer ECL and patterning the insulating material layer. To form the non-flat regions TSR of the insulating patterns IP, a light exposure mask including a plurality of regions having different light transmittances may be used during the operation of patterning the insulating material layer. As another example, the insulating patterns IP may be formed using the solvent compatibility varying depending on the kinds of materials. In more detail, to form the insulating patterns IP, a solution may be dropped in the form of dots using an ink jet apparatus at positions to form the insulating patterns IP. Here, a solute of the solution may have the same solvent compatibility as that of the material included in the uppermost layer of the encapsulating layer ECL. For example, if the uppermost layer of the encapsulating layer ECL includes hydrophilic or oleophobic material, the solute may include hydrophilic or oleophobic material. If the uppermost layer of the encapsulating layer ECL includes hydrophobic or oleophilic material, the solute may include hydrophobic or oleophilic material.

If the uppermost layer of the encapsulating layer ECL and the solute have different solvent compatibilities, a contact angle between the solution and the encapsulating layer ECL may be increased to 90° or more. If the contact angle between the solution and the encapsulating layer ECL is 90° or more, the uniformity of a layer to be formed during a subsequent process may be reduced. For example, if the contact angle between the solution and the encapsulating layer ECL is 90° or more, portions of the conductive layers formed on the insulating patterns IP may be open. However, if the uppermost layer of the encapsulating layer ECL and the solute have the same solvent compatibility, the contact angle between the solution and the encapsulating layer ECL may be less than 90°. If the contact angle between the solution and the encapsulating layer ECL is less than 90°, the uniformity of a layer to be formed during a subsequent process may be relatively high.

After the solution has been dropped in the form of dots, the insulating patterns IP may be formed by drying the solution. Here, because the contact angle between the solution and the encapsulating layer ECL is less than 90°, the insulating patterns IP may include the non-flat regions TSR. In addition, the smaller the diameter of each insulating pattern IP, the more the area of the flat region FSR is reduced.

After the insulating patterns IP have been formed, a conductive material layer CML may be formed on the encapsulating layer ECL and the insulating patterns IP.

Referring to FIG. 21, after the conductive material layer CML has been formed, a first conductive layer may be formed by patterning the conductive material layer CML. The first conductive layer may include first sensing electrodes TSE1, second sensing electrodes TSE2, and a second connection pattern CNP2. The first sensing electrodes TSE1 and the second sensing electrodes TSE2 may cover the insulating patterns IP. In other words, regions of the first sensing electrodes TSE1 and the second sensing electrodes TSE2 that are disposed on the non-flat regions TSR of the insulating patterns IP may have shapes corresponding to that of the non-flat regions TSR. Therefore, each of the first sensing electrodes TSE1 and the second sensing electrodes TSE2 may include a first region FR corresponding to the flat region FSR and a second region TR corresponding to the non-flat region TSR.

After the first conducive layer has been formed, a second insulating layer IL2 may be formed to cover the first conductive layer. The second insulating layer IL2 may include at least one of silicon oxide, silicon nitride, and silicon oxynitride.

Referring to FIG. 22, after the second insulating layer IL2 has been formed, contact holes may be formed by patterning the second insulating layer IL2 so that portions of the second connection CNP2 are exposed through the contact holes. After the contact holes have been formed, a second conductive layer may be formed by applying a conductive material on the second insulating layer IL2 and patterning the conductive material. The second conductive layer may include a first connection pattern CNP1 that electrically couples adjacent first sensing electrodes TSE1 with each other.

After the second conducive layer has been formed, a third insulating layer IL3 may be formed to cover the second conductive layer. The third insulating layer IL3 may prevent (or reduce) the second conductive layer from being exposed to the outside, thus preventing (or reducing) the second conductive layer from being corroded.

Figure 23:
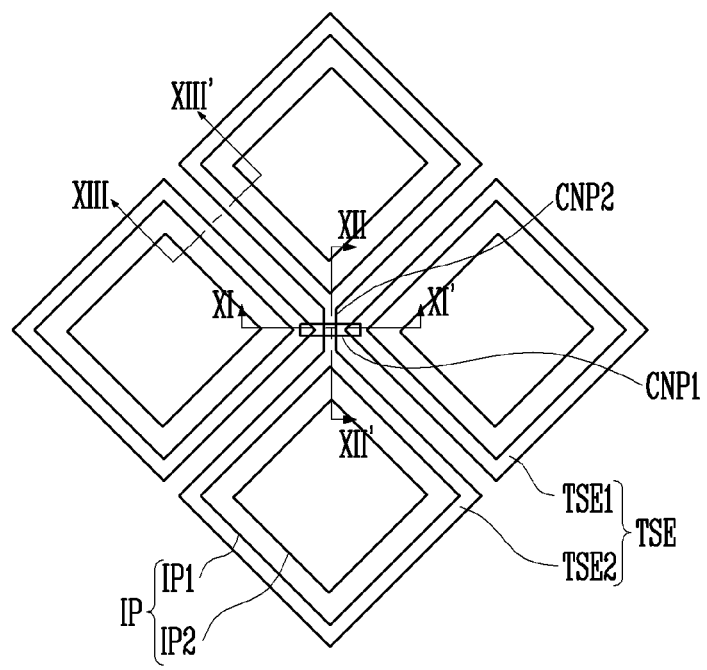
FIGS. 23, 24, 25, and 26 are sectional views illustrating a display device according to some exemplary embodiments.
Figure 24:
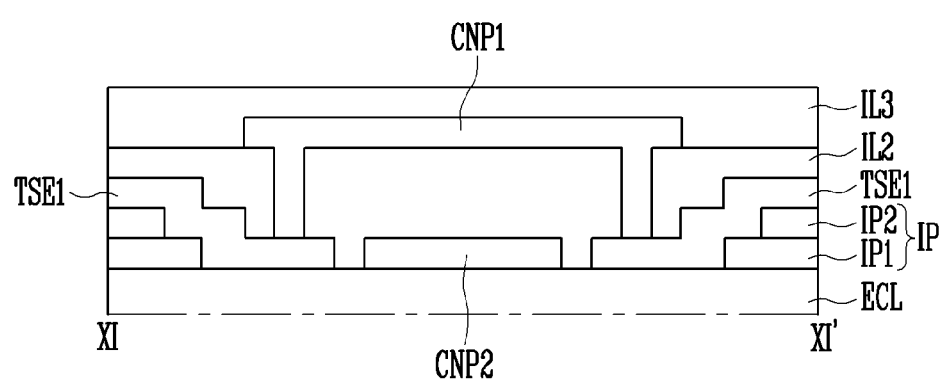
Figure 25:
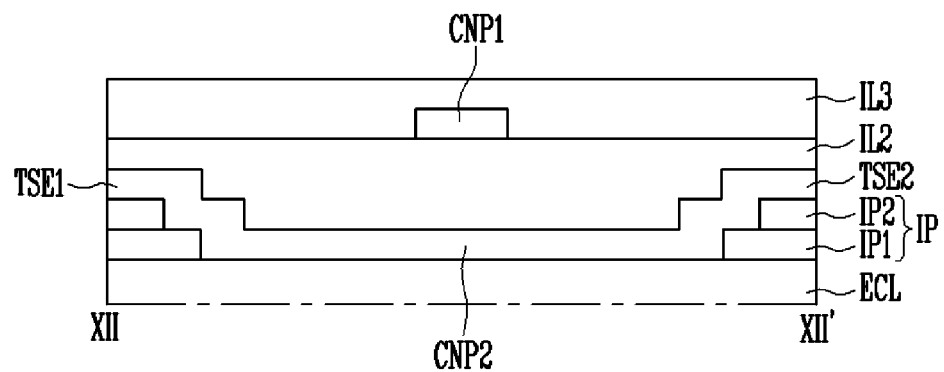
Figure 26:
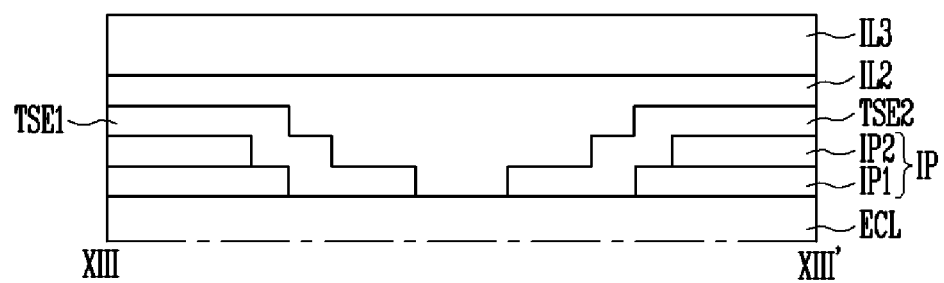

FIGS. 23 to 26 are sectional views illustrating a display device according to some exemplary embodiments. That is, FIG. 23 is a partial enlarged view illustrating the touch sensing electrodes TSE of the touch sensor TS shown in FIG. 2, FIG. 24 is a sectional view taken along sectional line XI-XI' of FIG. 23, FIG. 25 is a sectional view taken along sectional line XII-XII' of FIG. 23, and FIG. 26 is a sectional view taken along sectional line XIII-XIII' of FIG. 23 according to various exemplary embodiments.

Referring to FIGS. 1, 2, 4, and 23 to 26, the display device may include a display panel DPN and the touch sensor TS.

The display panel DPN may include a base substrate BS, a drive layer DDL provided on the base substrate BS, an optical layer OPL provided on the drive layer DDL, and an encapsulating layer ECL provided on the optical layer OPL. The encapsulating layer ECL may include a plurality of inorganic layers (not shown) and a plurality of organic layers (not shown).

The touch sensor TS may be disposed on a surface of the display panel DPN. For example, the touch sensor TS may be provided on the encapsulating layer ECL. The touch sensor TS may include a plurality of sensing rows and a plurality of sensing columns that intersect with each other. Each of the sensing rows may include first sensing electrodes TSE1 that are electrically coupled with each other by a first connection pattern CNP1. Each of the sensing columns may include second sensing electrodes TSE2 that are electrically coupled with each other by a second connection pattern CNP2.

The touch sensor TS may include a first insulating layer having a plurality of insulating patterns IP provided on the encapsulating layer ECL, a first conductive layer provided on the insulating patterns IP and the encapsulating layer ECL, a second insulating layer IL2 covering the first conductive layer, a second conductive layer provided on the second insulating layer IL2, and a third insulating layer IL3 covering the second conductive layer.

The insulating patterns IP may include first insulating patterns IP1 provided on the encapsulating layer ECL, and second insulating patterns IP2 provided on the first insulating pattern IP1. The edges of the first insulating patterns IP1 and the second insulating patterns IP1 IP2 may be perpendicular or inclined to the surfaces of the first insulating patterns IP1 and the second insulating patterns IP2. The area of the first insulating pattern IP1 may be greater than that of the second insulating pattern IP2. Therefore, each insulating pattern IP may have a stepped shape.

The first conductive layer may include the first sensing electrodes TSE1, the second sensing electrodes TSE2, and the second connection pattern CNP2.

The first sensing electrodes TSE1 and the second sensing electrodes TSE2 may cover the insulating patterns IP. Each of the first sensing electrodes TSE1 and the second sensing electrodes TSE2 may have a shape corresponding to that of the insulating patterns IP. For example, the surfaces of the first sensing electrodes TSE1 and the second sensing electrodes TSE2 may be parallel to the surfaces of the insulating patterns IP. In other words, in conformity with the stepped shape of each insulating pattern IP, each of the first sensing electrodes TSE1 and the second sensing electrodes TSE2 may also have a stepped shape. Thereby, the area with which portions of adjacent first sensing electrodes TSE1 and second sensing electrodes TSE2 face each other may be increased. When the area with which portions of the adjacent first sensing electrodes TSE1 and second sensing electrodes TSE2 face each other is increased, the capacitance of a capacitor formed between the adjacent first sensing electrodes TSE1 and second sensing electrodes TSE2 may be increased. Therefore, the touch sensitivity of the touch sensor TS may be enhanced.

Adjacent second sensing electrodes TSE2 may be electrically coupled with each other through the second connection pattern CNP2. The second insulating layer IL2 may cover the first conductive layer. The second insulating layer IL2 may include contact holes through which portions of the second connection pattern CNP2 is exposed.

The second conductive layer may include the first connection pattern CNP1. Adjacent first sensing electrodes TSE1 may be electrically coupled with each other through the first connection pattern CNP1. The third insulating layer IL3 may be provided on the second insulating layer IL2 and the second conductive layer.

Figure 27A:
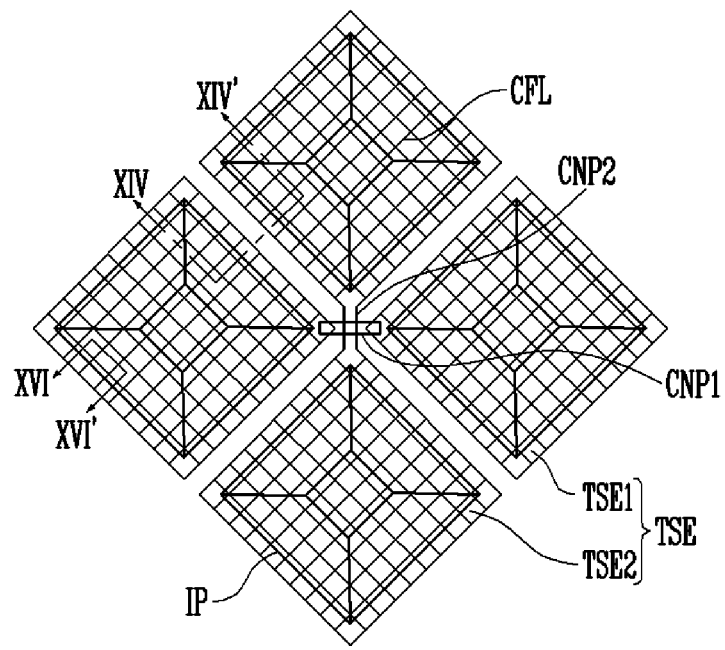
FIGS. 27A, 27B, 28A, 28B, and 29 are views illustrating a display device according to some exemplary embodiments.
Figure 27B:
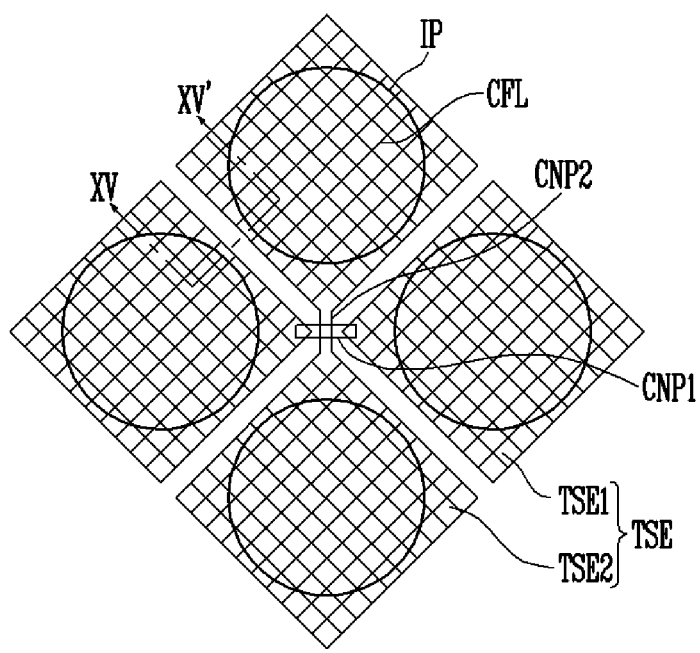
Figure 28A:
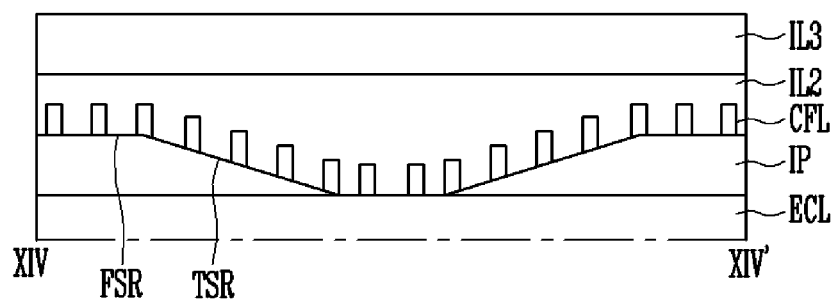
Figure 28B:
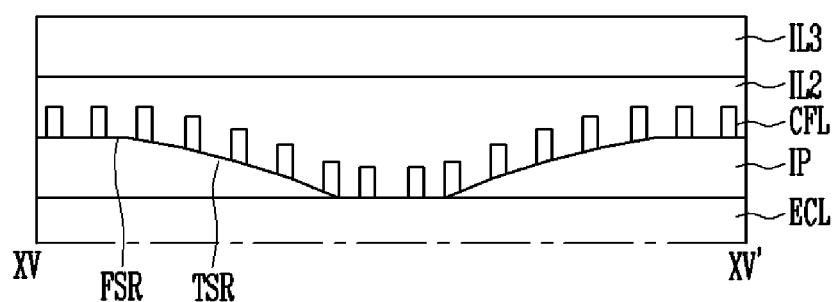
Figure 29:
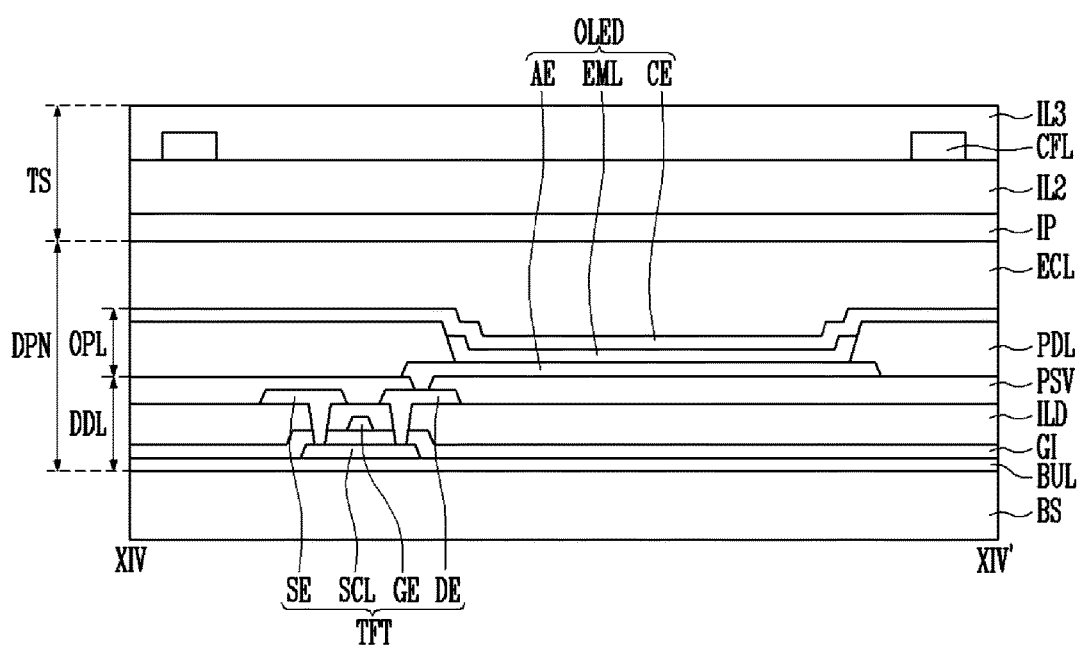

FIGS. 27A, 27B, 28A, 28B, and 29 are views illustrating a display device according to some exemplary embodiments. That is, FIGS. 27A and 27B are partial enlarged views illustrating the touch sensing electrodes TSE of the touch sensor TS shown in FIG. 2, FIG. 28A is a sectional view taken along sectional line XIV-XIV' of FIG. 27A, FIG. 28B is a sectional view taken along sectional line XV-XV' of FIG. 27B, and FIG. 29 is a sectional view taken along line XVI-XVI' of FIG. 27A according to various exemplary embodiments.

Referring to FIGS. 27A, 27B, 28A, 28B, and 29, the display device may include a display panel DPN and the touch sensor TS.

The display panel DPN may include a base substrate BS, a drive layer DDL provided on the base substrate BS, an optical layer OPL provided on the drive layer DDL, and an encapsulating layer ECL provided on the optical layer OPL. The encapsulating layer ECL may include a plurality of inorganic layers (not shown) and a plurality of organic layers (not shown).

The drive layer DDL may be provided on the base substrate BS and include at least one thin film transistor TFT provided in each pixel area. The optical layer OPL may include the display element OLED coupled to the thin film transistor TFT. The touch sensor TS may be disposed on a surface of the display panel DPN. For example, the touch sensor TS may be provided on the encapsulating layer ECL.

The touch sensor TS may include a plurality of sensing rows and a plurality of sensing columns that intersect with each other. Each of the sensing rows may include first sensing electrodes TSE1 that are electrically coupled with each other by a first connection pattern CNP1. Each of the sensing columns may include second sensing electrodes TSE2 that are electrically coupled with each other by a second connection pattern CNP2. The first sensing electrodes TSE1, the second sensing electrodes TSE2, and the second connection pattern CNP2 may include a plurality of conductive fine lines that intersect with each other.

The conductive fine lines CFL may be provided between adjacent pixel areas. For example, the conductive fine lines CFL may not overlap the display element OLED. In other words, the conductive fine lines CFL may be provided at positions other than a light-emitting region of the display element OLED.

The touch sensor TS may include a first insulating layer having a plurality of insulating patterns IP provided on the encapsulating layer ECL, a first conductive layer provided on the insulating patterns IP and the encapsulating layer ECL, a second insulating layer IL2 covering the first conductive layer, a second conductive layer provided on the second insulating layer IL2, and a third insulating layer IL3 covering the second conductive layer.

The insulating patterns IP may be disposed on the encapsulating layer ECL at positions spaced apart from each other. At least a portion of each insulating pattern IP may have a tapered shape. For example, each insulating pattern IP may include a flat region FSR having a flat surface, and a non-flat region TSR formed around the perimeter of the flat region FSR. The surface of the non-flat region TSR may be inclined relative to the surface of the flat region FSR.

The first conductive layer may include the first sensing electrodes TSE1, the second sensing electrodes TSE2, and the second connection pattern CNP2.

The first sensing electrodes TSE1 and the second sensing electrodes TSE2 may cover the insulating patterns IP. Therefore, each of the first sensing electrodes TSE1 and the second sensing electrodes TSE2 may include a region corresponding to the flat region FSR, and a region corresponding to the non-flat region TSR. Some of the conductive fine lines CFL may be disposed on the non-flat region TSR. The conductive fine lines CFL disposed on the non-flat regions TSR may increase the capacitance of a capacitor formed between adjacent first sensing electrodes TSE1 and second sensing electrodes TSE2.

Adjacent second sensing electrodes TSE2 may be electrically coupled with each other through the second connection pattern CNP2. The second insulating layer IL2 may cover the first conductive layer. The second conductive layer may include the first connection pattern CNP1. The first connection pattern CNP1 may electrically couple adjacent first sensing electrodes TSE1 with each other. The third insulating layer IL3 may be provided on the second insulating layer IL2 and the second conductive layer. The third insulating layer IL3 may prevent (or reduce) the second conductive layer from being exposed to the outside, thus preventing (or reducing) the second conductive layer from being corroded.

According to various exemplary embodiments, capacitance of a capacitor formed between adjacent sensing electrodes of a touch sensor can be increased. In this manner, the sensing sensitivity of the touch sensor may be enhanced.

Although certain exemplary embodiments and implementations have been described herein, other embodiments and modifications will be apparent from this description.

Accordingly, the inventive concepts are not limited to such embodiments, but rather to the broader scope of the presented claims and various obvious modifications and equivalent arrangements.

What is claimed is:

1. A touch sensor comprising:
   insulating patterns spaced apart from one another;
   sensing electrodes disposed directly on the insulating patterns; and
   a sensing line coupled to the sensing electrodes,
   wherein each of the sensing electrodes comprises:
   a first region having a flat surface; and
   a second region disposed around a perimeter of the first region, a surface of the second region forming an inclination angle relative to the flat surface of the first region, and
   wherein each of the sensing electrodes covers a corresponding insulating pattern of the insulating patterns.

2. The touch sensor according to claim 1, wherein each of the insulating patterns comprises:
   a flat region having a flat surface corresponding to the first region; and
   a non-flat region forming an inclination angle relative to the flat surface of the flat region, the non-flat region corresponding to the second region.

3. The touch sensor according to claim 2, wherein a surface of the non-flat region is a surface inclined to the flat surface of the flat region.

4. The touch sensor according to claim 2, wherein a surface of the non-flat region is a curved surface coupled to the flat surface of the flat region.

5. The touch sensor according to claim 2, wherein:
   the first region corresponds to the flat region; and
   the second region corresponds to the non-flat region.

6. The touch sensor according to claim 2, wherein:
   the sensing electrodes comprise conductive fine lines intersecting with each other; and
   at least some of the conductive fine lines are disposed on the non-flat region.

7. The touch sensor according to claim 2, wherein:
   each of the insulating patterns comprises:
   a first insulating pattern; and
   a second insulating pattern disposed on the first insulating pattern; and
   an area of the first insulating pattern is greater than an area of the second insulating pattern.

8. The touch sensor according to claim 1, wherein the sensing electrodes comprise:
   first sensing electrodes electrically coupled with each other, the first sensing electrodes being arranged in a first direction; and
   second sensing electrodes electrically coupled with each other, the second sensing electrodes being arranged in a second direction intersecting the first direction.

9. A display device comprising:
   a display panel; and
   a touch sensor disposed on the display panel,
   wherein the touch sensor comprises:
   insulating patterns spaced apart from one another;
   sensing electrodes disposed directly on the insulating patterns; and
   a sensing line coupled to the sensing electrodes,
   wherein each of the sensing electrodes comprises:
   a first region having a flat surface; and
   a second region disposed around a perimeter of the first region, a surface of the second region forming an inclination angle relative to the flat surface of the first region, and
   wherein each of the sensing electrodes covers a corresponding insulating pattern of the insulating patterns.

10. The display device according to claim 9, wherein:
    the display panel comprises:
    a substrate;
    a display element disposed on the substrate; and
    an encapsulating layer covering the display element, the encapsulating layer comprising insulating layers; and
    the touch sensor is disposed on the encapsulating layer.

11. The display device according to claim 10, wherein each of the insulating patterns comprises:
    a flat region having a flat surface corresponding to the first region; and
    a non-flat region forming an inclination angle relative to the flat surface of the flat region, the non-flat region corresponding to the second region.

12. The display device according to claim 11, wherein a surface of the non-flat region is a surface inclined to the flat surface of the flat region.

13. The display device according to claim 11, wherein a surface of the non-flat region is a curved surface coupled to the flat surface of the flat region.

14. The display device according to claim 11, wherein:
    the first region corresponds to the flat region; and
    the second region corresponds to the non-flat region.

15. The display device according to claim 11, wherein:
    the sensing electrodes include conductive fine lines intersecting with each other; and
    at least some of the conductive fine lines are disposed on the non-flat region.

16. The display device according to claim 15, wherein the conductive fine lines are disposed between adjacent pixel regions of the display panel.

17. The display device according to claim 11, wherein:
    each of the insulating patterns comprises:
    a first insulating pattern; and
    a second insulating pattern disposed on the first insulating pattern; and
    an area of the first insulating pattern is greater than an area of the second insulating pattern.

18. The display device according to claim 11, wherein a solvent compatibility of a material of the insulating pattern is equivalent to a solvent compatibility of a material of an uppermost layer of the encapsulating layer.

19. A method of fabricating a display device, the method comprising:
    forming a touch sensor on a display panel of the display device,
    wherein the display panel comprises:
    a substrate;
    a display element disposed on the substrate; and
    an encapsulating layer covering the display element, the encapsulating layer comprising a plurality of layers,
    wherein forming the touch sensor comprises:
    forming an insulating layer on the encapsulating layer of the display panel; and
    forming a conductive layer on the insulating layer, and wherein the conductive layer comprises sensing electrodes, each of the sensing electrodes comprising:
a first region having a flat surface; and
a second region disposed around a perimeter of the first region, a surface of the second region forming an inclination angle relative to the flat surface of the first region.

20. The method according to claim 19, wherein:
forming the conductive layer comprises:
forming a conductive material layer on the insulating layer;
forming a mask pattern on the conductive material layer using a light exposure mask; and
forming the sensing electrodes by patterning the conductive material layer using the mask pattern; and
the light exposure mask comprises:
a first light transmitting region;
a second light transmitting region corresponding to the second region; and
a light blocking region corresponding to the first region.

21. The method according to claim 20, wherein:
the second light transmitting region is disposed between the first light transmitting region and the light blocking region; and
a light transmittance of the first light transmitting region is greater than a light transmittance of the second light transmitting region.

22. The method according to claim 21, wherein the light transmittance of the second light transmitting region:
increases with decreasing distance to the first light transmitting region; and
reduces with reducing distance to the light blocking region.

23. The method according to claim 19, wherein:
forming the insulating layer comprises forming an insulating pattern between the display panel and each of the sensing electrodes; and
the insulating pattern comprises:
a flat region having a flat surface corresponding to the first region; and
a non-flat region forming an inclination angle relative to the flat surface of the flat region, the non-flat region corresponding to the second region.

24. The method according to claim 23, wherein a surface of the non-flat region is a surface inclined to the flat surface of the flat region.

25. The method according to claim 23, wherein a surface of the non-flat region is a curved surface coupled to the flat surface of the flat region.

26. The method according to claim 23, wherein:
the insulating pattern comprises:
a first insulating pattern; and
a second insulating pattern disposed on the first insulating pattern; and
an area of the first insulating pattern is greater than an area of the second insulating pattern.

27. The method according to claim 19, wherein:
forming the insulating patterns comprises:
dropping, using an ink jet apparatus, solution on the encapsulating layer in a form of dots at positions corresponding to the respective sensing electrodes; and
drying the dots of the solution; and
wherein a solvent compatibility of a solute of the solution is equivalent to a solvent compatibility of a material of an uppermost layer of the encapsulating layer.

28. The method according to claim 27, wherein:
the uppermost layer comprises a hydrophilic or oleophobic material; and
the insulating pattern comprises a hydrophilic or oleophobic material.

29. The method according to claim 27, wherein:
the uppermost layer comprises a hydrophobic or oleophilic material; and
the insulating pattern comprises a hydrophobic or oleophilic material.

30. A touch sensor comprising:
insulating patterns spaced apart from one another, each insulating pattern comprising:
a first insulating pattern layer; and
a second insulating pattern layer disposed on the first insulating pattern layer; and
sensing electrodes, each sensing electrode covering a corresponding insulating pattern of the insulating patterns,
wherein an area of the first insulating pattern layer differs from an area of the second insulating pattern layer.

31. The touch sensor according to claim 30, wherein, in a plan view, a surface area of the first insulating pattern layer is greater than a surface area of the second insulating pattern layer.

32. The touch sensor according to claim 31, wherein surfaces of the sensing electrodes are parallel to corresponding surfaces of the insulating patterns.

* * * * *